United States Patent
Park

(10) Patent No.: US 12,049,119 B2
(45) Date of Patent: Jul. 30, 2024

(54) APPARATUS FOR CONTROLLING ENERGY OF FUEL CELL VEHICLE

(71) Applicants: HYUNDAI MOTOR COMPANY, Seoul (KR); KIA CORPORATION, Seoul (KR)

(72) Inventor: Won Ki Park, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 379 days.

(21) Appl. No.: 17/512,181

(22) Filed: Oct. 27, 2021

(65) Prior Publication Data

US 2023/0001761 A1    Jan. 5, 2023

(30) Foreign Application Priority Data

Jul. 1, 2021    (KR) .......................... 10-2021-0086603

(51) Int. Cl.
| | |
|---|---|
| *B60H 1/00* | (2006.01) |
| *B60L 7/22* | (2006.01) |
| *B60L 58/33* | (2019.01) |
| *B60L 58/40* | (2019.01) |
| *H01M 8/04007* | (2016.01) |

(Continued)

(52) U.S. Cl.
CPC ............ *B60H 1/00278* (2013.01); *B60L 7/22* (2013.01); *B60L 58/33* (2019.02); *B60L 58/40* (2019.02); *H01M 8/04029* (2013.01); *H01M 8/04074* (2013.01); *H01M 8/04701* (2013.01); *H01M 2250/20* (2013.01)

(58) Field of Classification Search
CPC .......... B60H 1/034; B60H 1/143; B60H 1/14; B60H 1/2221; B60H 1/00278; B60H 1/00385; B60L 7/22; H01M 8/04029; H01M 8/04074; H01M 8/04701
See application file for complete search history.

(56) References Cited

U.S. PATENT DOCUMENTS

| | | | | |
|---|---|---|---|---|
| 2001/0045103 | A1* | 11/2001 | Khelifa | B60H 1/323 62/244 |
| 2009/0130513 | A1* | 5/2009 | Tsuchiya | B60K 1/04 429/412 |
| 2019/0271258 | A1* | 9/2019 | Mendez Abrego | F01P 7/164 |

(Continued)

FOREIGN PATENT DOCUMENTS

| | | | | |
|---|---|---|---|---|
| DE | 102012019459 | A1 * | 3/2013 | ......... B60H 1/00764 |
| JP | 7-245807 | A | 9/1995 | |

(Continued)

*Primary Examiner* — Jianying C Atkisson
*Assistant Examiner* — For K Ling
(74) *Attorney, Agent, or Firm* — MORGAN, LEWIS & BOCKIUS LLP

(57) ABSTRACT an apparatus for controlling energy of a fuel cell vehicle, which may expand a usable range of an energy consuming device, may increase efficiency of heating and cooling, and may simplify a layout of the device. The apparatus includes a stack cooling line having a first coolant heated by a fuel cell stack and cooled by a first heat exchanger; a resistor cooling line having a second coolant heated by a braking resistor and cooled by a second heat exchanger; and a third heat exchanger configured to exchange heat between the first coolant of the stack cooling line and the second coolant of the resistor cooling line.

17 Claims, 10 Drawing Sheets

(51) Int. Cl.
     *H01M 8/04029*     (2016.01)
     *H01M 8/04701*     (2016.01)

(56) References Cited

U.S. PATENT DOCUMENTS

| | | | | |
|---|---|---|---|---|
| 2019/0329628 A1* | 10/2019 | Zenner | ............... | F01M 5/002 |
| 2020/0047586 A1* | 2/2020 | Gonze | ............... | B60H 1/3227 |
| 2021/0036342 A1 | 2/2021 | Seo | | |
| 2021/0188043 A1* | 6/2021 | Smith | ............... | B60H 1/00278 |
| 2023/0052550 A1* | 2/2023 | Gashi | ............... | H01M 10/667 |

FOREIGN PATENT DOCUMENTS

| | | | | |
|---|---|---|---|---|
| JP | 2001-159301 A | | 6/2001 | |
| JP | 2006-147588 A | | 6/2006 | |
| JP | 2006-344498 A | | 12/2006 | |
| JP | 2010-179717 A | | 8/2010 | |
| KR | 2009057491 A | * | 6/2009 | ......... B60H 1/00385 |
| KR | 10-2017-0069376 A | | 6/2017 | |
| WO | WO-2008147305 A1 | * | 12/2008 | ............. B60H 1/004 |

* cited by examiner

APPARATUS FOR CONTROLLING ENERGY OF FUEL CELL VEHICLE

CROSS-REFERENCE TO RELATED APPLICATION(S)

This application claims benefit of priority to Korean Patent Application No. 10-2021-0086603 filed on Jul. 1, 2021 in the Korean Intellectual Property Office, the disclosure of which is incorporated herein by reference in its entirety.

TECHNICAL FIELD

The present disclosure relates to an apparatus for controlling energy of a fuel cell vehicle which may expand a usable range of an energy consuming device, may increase efficiency of heating and cooling, and may simplify a layout of a device.

BACKGROUND

A large-sized electric vehicle such as a bus or truck equipped with a fuel cell system, for example, may be driven by operating a driving motor with electricity produced by a fuel cell stack. In other words, an electric vehicle may be driven only by the driving force of the driving motor without an engine.

Such an electric vehicle may have an energy regenerative function, and a driving motor may rotate by inertia and may work as a generator during a deceleration process or a downhill driving, such that the kinetic energy of the electric vehicle may be converted into electrical energy and the electrical energy may be stored in a battery.

Also, the electric vehicle may continuously consume electricity by converting electrical energy into thermal energy by flowing electricity generated by the driving motor to a braking resistor, and the driving motor may generate continuous braking force by reverse torque.

As such, by including an energy consuming device, a large-sized electric vehicle may secure regenerative braking and may satisfy laws pertaining to auxiliary braking. However, in a general electric vehicle, a cooling circuit of a fuel cell system and a cooling circuit of a braking resistor may be configured independently, such that there may be limitation in using the components as energy consuming devices, and efficiency of cooling and heating may be lowered, while a layout of the device may be complicated.

The information disclosed in the Background section above is to aid in the understanding of the background of the present disclosure, and should not be taken as acknowledgement that this information forms any part of prior art.

SUMMARY

An aspect of the present disclosure is to provide an apparatus for controlling energy of a fuel cell vehicle, which may expand a usable range of an energy consuming device, may increase efficiency of heating and cooling, and may simplify a layout of the device.

According to an aspect of the present disclosure, an apparatus for controlling energy of a fuel cell vehicle includes a stack cooling line having a first coolant heated by a fuel cell stack and cooled by a first heat exchanger; a resistor cooling line having a second coolant heated by a braking resistor and cooled by a second heat exchanger; and a third heat exchanger configured to exchange heat between the first coolant of the stack cooling line and the second coolant of the resistor cooling line.

The third heat exchanger may be configured to exchange heat between the first coolant flowing out of the first heat exchanger before flowing into the fuel cell stack and the second coolant flowing out of the second heat exchanger before flowing into the braking resistor.

The apparatus may further include a first connection line connecting the third heat exchanger to the stack cooling line, and a second connection line connecting the third heat exchanger to the resistor cooling line.

Among connection points between the resistor cooling line and the second connection line, a first three-way valve may be installed in a connection point adjacent to the braking resistor, into which the second coolant flows, and a second three-way valve may be installed in a connection point adjacent to the second heat exchanger, of which the second coolant flows out.

The apparatus may further include a heating line connected to the resistor cooling line, the heating line may include at least one heater for heating the second coolant to increase a temperature of the second coolant, and the heating line may be connected to a heating circuit system for heating an interior of the vehicle.

The first three-way valve may be disposed in a connection point on a first side of the heating line, and the heating line may be connected to the second connection line.

A first port of the first three-way valve may be connected to a heating circuit system side of the heating line, a second port may be connected to a heater side of the heating line, and a third port may be connected to an outlet side of the third heat exchanger; and a first port of the second three-way valve may be connected to the second heat exchanger side of the resistor cooling line, a second port may be connected to a heating circuit system side of the heating line, and the third port may be connected to an inflow side of the third heat exchanger.

A distribution manifold may be disposed in a connection point on a second side of the heating line opposing the first side, wherein the distribution manifold has at least three connection ports.

The distribution manifold may include a first connection port for receiving the second coolant from the at least one heater, a second connection port for providing the second coolant to the heating circuit system, and a third connection port for providing the second coolant to the braking resistor of the resistor cooling line.

The heating circuit system and the at least one heater may be connected to the distribution manifold in parallel.

When operating in a first heating mode, the at least one heater may operate, and the second coolant heated by the at least one heater may transfer heat to the heating circuit system and may circulate along the heating line.

In the first heating mode, the third port of the first three-way valve may be closed and the first port may be connected to the second port; and the first port of the second three-way valve may be closed and the second port may be connected to the third port.

When operating in a second heating mode, the at least one heater may operate, the second coolant heated by the at least one heater may transfer heat to the heating circuit system and may flow into the second connection line, and the second coolant in the third heat exchanger may be preheated by exchanging heat with the first coolant, and may circulate to be supplied to the at least one heater.

In the second heating mode, the first port of the first three-way valve may be closed and the third port may be connected to the second port; and the first port of the second three-way valve may be closed and the second port may be connected to the third port.

When operating in a heating and braking mode, the at least one heater and the braking resistor may operate, a portion of the second coolant heated by the at least one heater may transfer heat to the heating circuit system and may flow into the second connection line or circulate along the heating line, another portion of the second coolant heated by the at least one heater may pass through the distribution manifold, may be supplied to the braking resistor, may be further heated in the braking resistor, may flow along the resistor cooling line, and may flow into the second connection line, and the second coolant passing through the third heat exchanger may circulate to be supplied to the at least one heater.

In the heating and braking mode, the first port, the second port, and the third port of the first three-way valve may be connected to each other; and the first port, the second port, and the third port of the second three-way valve may be connected to each other.

When operating in a braking mode, at least the braking resistor among the at least one heater and the braking resistor may operate, the second coolant passing through the at least one heater may pass through the distribution manifold, may be supplied to the braking resistor, may be heated in the braking resistor, may flow along the resistor cooling line, and may flow into the second connection line, and the second coolant in the third heat exchanger may exchange heat with the first coolant passing through the first heat exchanger, may radiate heat, and may circulate to be supplied to the at least one heater.

When operating in a cooling mode, the at least one heater and the braking resistor do not operate, the second coolant passes through the at least one heater, the distribution manifold, and the braking resistor, flows along the resistor cooling line, and flows into the second connection line, and the second coolant in the third heat exchanger exchanges heat with the first coolant of the stack cooling line, absorbs heat, and circulates to be supplied to the at least one heater.

In the braking mode or the cooling mode, the first port of the first three-way valve may be closed and the second port may be connected to the third port; and the second port of the second three-way valve may be closed and the first port may be connected to the third port.

The braking resistor may be electrically connected to a driving motor working as a generator during braking, when braking, electrical energy regenerated by the driving motor may be charged in the battery, and when braking, at least one of a fan of the first heat exchanger, a first pump of the stack cooling line, a fan of the second heat exchanger, a second pump of the resistor cooling line, the at least one heater, the braking resistor, or a third pump of a battery cooling line for cooling the battery may be controlled to work as an energy consuming device for regenerative braking.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
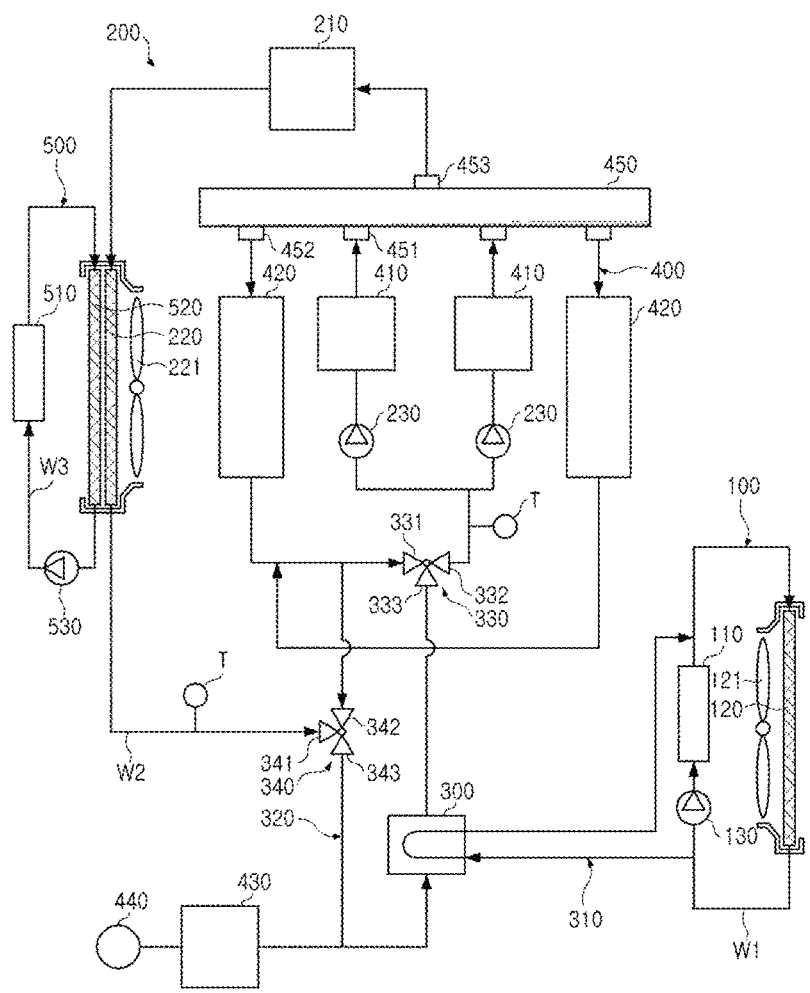
FIG. 1 is a diagram illustrating an apparatus for controlling energy of a fuel cell vehicle according to an exemplary embodiment of the present disclosure.

In the description below, embodiments of the present disclosure will be described as follows with reference to the attached drawings.

Large-sized vehicles such as a bus and a truck may use air brakes which may be easy to handle and have fewer malfunctions as main braking devices, but when driving downhill, since the weight of the vehicle body is relatively heavy, issues such as heat generation due to braking may not be addressed only by the main braking device or it may be impossible to stably drive downhill.

Therefore, a separate auxiliary braking device for assisting the braking force of the main braking device and enabling safe deceleration by continuously maintaining braking force for a long time while reducing the load may be used, and performance of the auxiliary braking device has been regulated by law.

In a large-sized vehicle using an engine, a device such as an engine brake, an exhaust brake or a retarder may be used as an auxiliary braking device.

Since a large-sized electric vehicle equipped with a fuel cell system may only be driven by the driving force of a driving motor without an engine, the driving motor may not be used as an auxiliary braking device as an engine brake or an exhaust brake, and further, as the driving motor is applied, there may be no transmission such that it may be impossible to use a retarder.

Accordingly, a large-sized electric vehicle may include an energy consuming device which may flow electricity generated by the driving motor to a braking resistor as described above, thereby converting electrical energy into thermal energy and continuously consuming electricity, and the driving motor may generate continuous braking force by reverse torque, thereby satisfying laws pertaining to auxiliary braking.

In the exemplary embodiment, a method to optimize the control of thermal energy may be suggested to control electrical energy, to expand a usable range of the energy consuming device, and to increase efficiency of heating and cooling so as to satisfy the laws pertaining to auxiliary braking.

Also, in the exemplary embodiment, a method of simplifying the layout of the apparatus for controlling energy may be suggested.

In the exemplary embodiment, a large-sized electric vehicle equipped with a fuel cell system will be described as an example, but an exemplary embodiment thereof is not limited thereto.

Hereinafter, the exemplary embodiment will be described in greater detail with reference to the drawings. It should be noted that the same components are assigned the same reference numerals even though they are indicated on different drawings.

In the exemplary embodiments, a vehicle refers to various vehicles which may transport an object such as a person, an animal, or an item from a departure point to a destination. Such vehicles are not limited to vehicles traveling on roads or tracks.

While terms such as "first," "second," "third," or the like, may be used to describe various components, such components must not be understood as being limited in order, size, location, or importance by the above terms. The above terms are used only to distinguish one component from another.

FIG. 1 is a diagram illustrating an apparatus for controlling energy of a fuel cell vehicle according to an exemplary embodiment, illustrating a flow of a coolant.

The apparatus for controlling energy of a fuel cell vehicle in an exemplary embodiment may include a stack cooling line 100 and a resistor cooling line 200.

The stack cooling line 100 may be a flow path for cooling the fuel cell stack 110. Since the reaction occurring in the fuel cell stack is an exothermic reaction, it may be necessary to properly cool the fuel cell stack.

The stack cooling line 100 for cooling the fuel cell stack 110 may be provided independently from the cooling line for cooling the components other than the fuel cell stack 110.

The stack cooling line 100 may include a first heat exchanger 120. The first heat exchanger may be configured to cool a first coolant W1 flowing along the stack cooling line, and may be configured as a radiator. The first coolant may be water or an incompressible fluid. The other coolant described below may be the same.

The first heat exchanger 120 may include a fan 121 electrically connected to a battery to rotate by receiving power from the battery 510. For example, a temperature sensor (not illustrated) may be installed in or adjacent to the first heat exchanger and may sense the temperature of the first coolant W1, and the fan may be controlled to rotate by a motor receiving power from the battery so as to provide a constant airflow to the first heat exchanger.

The stack cooling line 100 may include a first pump 130 for pressurizing the first coolant W1. The first pump may be configured as an electric water pump driven by a motor receiving power from the battery 510, and circulating the first coolant. The other pumps described below may be configured the same. The first pump may operate according to the temperature of the first coolant.

Accordingly, the fuel cell stack 110 may be cooled by the first coolant W1 circulating between the fuel cell stack 110 and the first heat exchanger 120 by the first pump 130. The first coolant heated while cooling the fuel cell stack 110 may be cooled by the first heat exchanger 120, and may flow back into the fuel cell stack and may cool the fuel cell stack 110.

The resistor cooling line 200 may be configured as a flow path for cooling the braking resistor 210 included in the energy consuming device for auxiliary braking of the fuel cell vehicle.

The braking resistor 210 may configured as a water-cooled electrical resistor, and may have a structure in which a resistor may be provided in a pipe through which a coolant may flow. When electricity flows through the resistor, heat may be generated, and the heat may be transferred to the coolant passing through the pipe and may be discharged. By controlling the appropriate flow rate of the coolant and the temperature of the resistor, the braking resistor may ensure power consumption required for safety.

The braking resistor 210 may be electrically connected to the driving motor 630 (see FIG. 3) which may work as a generator during braking, may convert electrical energy generated by the driving motor into thermal energy and may continuously consume electricity. Accordingly, the braking resistor may enable the driving motor to generate continuous braking force by reverse torque.

The resistor cooling line 200 for cooling the braking resistor 210 may include a second heat exchanger 220. The second heat exchanger may be configured to cool the second coolant W2 flowing along the resistor cooling line, and may be configured as a radiator.

The second heat exchanger 220 may include a fan 221 electrically connected to the battery to rotate by receiving power from the battery 510. For example, a temperature sensor T may be installed in or adjacent to the second heat exchanger and may sense the temperature of the second coolant W2, and the fan may be controlled to rotate by a motor receiving power from the battery so as to provide a constant airflow to the second heat exchanger.

The resistor cooling line 200 may include a second pump 230 for pressurizing the second coolant W2. The second pump may be an electric water pump driven by a motor receiving power from the battery 510 and circulating the second coolant. The second pump may operate according to the temperature of the second coolant.

Accordingly, the braking resistor 210 may be cooled by the second coolant W2 circulating between the braking resistor 210 and the second heat exchanger 220 by the second pump 230. The second coolant heated by heat dissipation of the braking resistor may be cooled by the second heat exchanger, may flow back into the braking resistor and may cool the braking resistor.

As described above, the apparatus for controlling energy of a fuel cell vehicle in an exemplary embodiment may cool the component requiring cooling by the separate cooling line configured based on heat generation properties thereof.

In other words, the apparatus for controlling energy of a fuel cell vehicle in an exemplary embodiment may include the stack cooling line 100 for cooling the fuel cell stack 110 of which the amount of generated heat may increase when the vehicle is driven, and the resistor cooling line 200 for cooling the braking resistor 210 of which the amount of generated heat may increase during braking of the vehicle.

The stack cooling line 100 and the resistor cooling line 200 may be configured as closed circuits. In other words, the coolant of each cooling line may be configured to circulate.

Also, since the heat exchangers 120 and 220 may be individually designed or operated in consideration of the properties required for the stack cooling line 100 and the resistor cooling line 200, the apparatus for controlling energy of a fuel cell vehicle according to the exemplary embodiment may improve cooling efficiency. For example, the heat exchangers provided in each cooling line may have different cooling capacities or different sizes.

However, when the stack cooling line 100 and the resistor cooling line 200 are configured and operated independently, there may be a limitation in using the components as energy consuming devices.

To address the issue above, the apparatus for controlling energy of a fuel cell vehicle in an exemplary embodiment may include a third heat exchanger 300 for exchanging heat between the first coolant W1 of the stack cooling line 100 and the second coolant W2 of the resistor cooling line 200.

For example, as illustrated in FIG. 1, the third heat exchanger 300 may be configured to exchange heat between the first coolant W1 flowing out of the first heat exchanger 120 and before flowing into the fuel cell stack 110 and the second coolant W2 flowing out of the second heat exchanger 220 and before flowing into the braking resistor 210.

To this end, the apparatus for controlling energy of a fuel cell vehicle in an exemplary embodiment may include a first connection line 310 for connecting the third heat exchanger 300 to the stack cooling line 100.

For example, as illustrated in FIG. 1, the first connection line 310 may connect a point in which the first coolant flows into the fuel cell stack to a point in which the first coolant flows out of the fuel cell stack in the stack cooling lines 100.

Also, the apparatus for controlling energy of a fuel cell vehicle in an exemplary embodiment may include a second connection line 320 for connecting the third heat exchanger 300 to the resistor cooling line 200.

For example, as illustrated in FIG. 1, the second connection line 320 may connect a point of the resistor cooling line 200 in which the second coolant W2 flows out of the second heat exchanger 220 to a point in which the second coolant flows into the braking resistor 210.

A valve may be installed in each connection point of the resistor cooling line 200 and the second connection line 320. For example, a first three-way valve 330 may be installed in a connection point adjacent to the braking resistor 210, in which the second coolant W2 flows into the braking resistor, and a second three-way valve 340 may be installed in a connection point adjacent to the second heat exchanger 220, in which the second coolant W2 flows out of the second heat exchanger.

Figure 3:
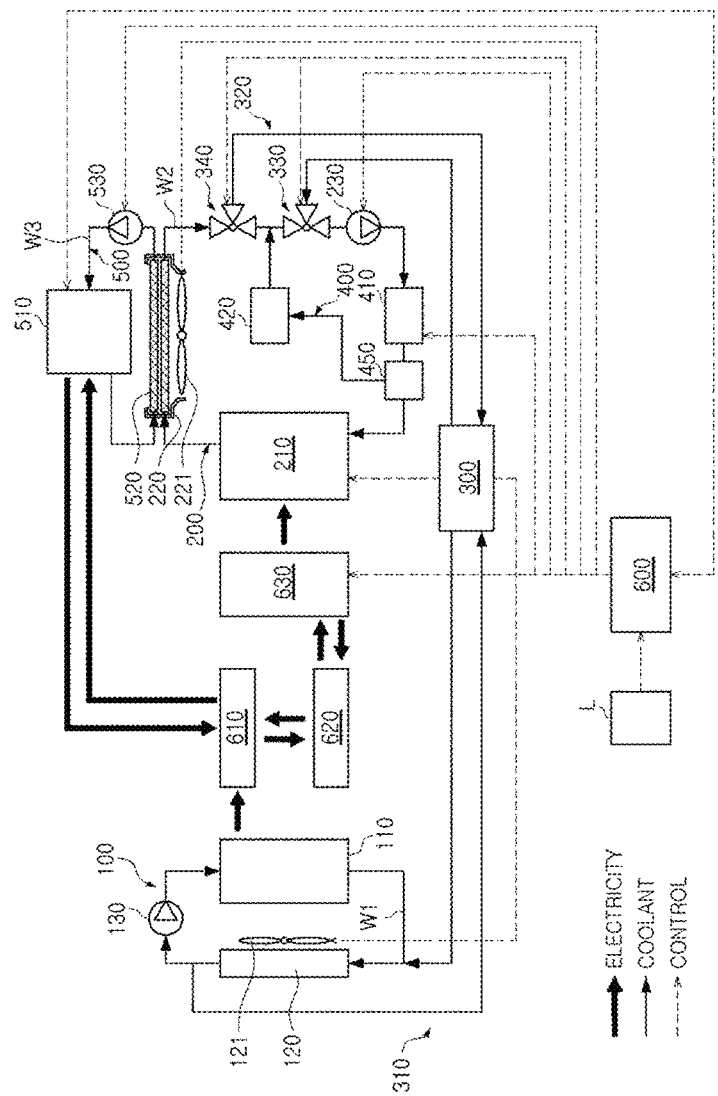
FIG. 3 is a diagram illustrating a flow of electricity along with a flow of coolant in an apparatus for controlling energy of a fuel cell vehicle according to an exemplary embodiment of the present disclosure.

The first and second three-way valves 330 and 340 may be configured as electric three-way valves driven by a motor connected to a separate power source under the control of a control unit 600 (see FIG. 3). As the internal valve body according to the driving of the motor rotates, for example, at an angle of 5°, 45°, 75°, 95°, or the like with respect to a zero point, such that the opening or closing may be controlled, and a flow direction and a flow path of the second coolant W2 may be determined. Also, the flow rate of the second coolant flowing to the cooling line or the connection line connected to each valve may be adjusted.

The first three-way valve 330 may include a first port 331, a second port 332, and a third port 333. The first three-way valve may open or close a desired port by changing an angular position of the built-in valve body (not illustrated).

Similarly, the second three-way valve 340 may include a first port 341, a second port 342, and a third port 343. The second three-way valve may open or close a desired port by changing an angular position of the built-in valve body (not illustrated).

Also, the first three-way valve 330 and the second three-way valve 340 may operate according to the temperature of the second coolant W2. To this end, the resistor cooling line 200 may be equipped with a temperature sensor T before and after the connection point of the second connection line 320. Alternatively, a temperature sensor may also be mounted on the braking resistor 210 or the heater 410, or in a region adjacent to the components.

Accordingly, by the third heat exchanger 300 interposed between the stack cooling line 100 and the resistor cooling line 200 as a medium, the cooling capacity required for one of the first heat exchanger 120 and the second heat exchanger 220 may be shared with the other. For example, the cooling capacity required for the first heat exchanger 120 may be shared with the second heat exchanger 220 by the third heat exchanger 300, and vice versa.

Also, when the first coolant W1 and the second coolant W2 are used for heating the interior of the vehicle, heating performance may improve.

The apparatus for controlling energy of a fuel cell vehicle in an exemplary embodiment may include a heating line 400 connected to the resistor cooling line 200 for heating the interior of the vehicle.

The heating line 400 may connect a point of the resistor cooling line 200 in which the second coolant W2 flows out of the second heat exchanger 220, and a point in which the second coolant W2 flows into the braking resistor 210. The heating line may form a portion of the resistor cooling line.

The heating line 400 may include at least one heater 410 for increasing the temperature of the second coolant W2 by heating the second coolant. The heater is not limited to any particular heater as long as the heater may directly heat water instantaneously using electricity. The water heated by the heater may be used to heat the interior of the vehicle.

Accordingly, the heater 410 may receive power from the battery 510 and may use electrical energy to heat the second coolant W2.

The second pump 230 of the resistor cooling line 200 may supply the second coolant W2 to the heater 410. If necessary, the second pump may be provided to correspond to the number of heaters.

For example, as illustrated in FIG. 1, when the interior of the fuel cell vehicle is divided into a plurality of heating zones, such as front and rear or left and right regions, and a separate heating circuit system 420 for each heating zone is provided, a dedicated heater 410 and a dedicated second pump 230 for each heating circuit system may be provided. Accordingly, the heating line 400 may be connected to the heating circuit system.

The heating circuit system 420 may include a heat exchange unit configured to allow heat exchange between the second coolant W2 heated by the heater 410 and air, and a blower configured to discharge the heated air from the heat exchange unit to the heating area in the vehicle, thereby allowing for heating.

The first three-way valve 330 may be disposed in a connection point on one side of the heating line 400. By the first three-way valve, the heating line may be connected to the second connection line 320 connected to the third heat exchanger 300. Accordingly, the heating line 400 may be disposed between the second connection line 320 of the resistor cooling line 200 and the braking resistor 210.

The first port 331 of the first three-way valve 330 may be connected to the heating circuit system 420 side of the heating line 400, the second port 332 may be connected to the heater 410 side of the heating line, and the third port 333 may be connected to an outlet side of the third heat exchanger 300.

Also, the first port 341 of the second three-way valve 340 may be connected to the second heat exchanger 220 side of the resistor cooling line 200, the second port 342 may be connected to the heating circuit system 420 side of the heating line 400, and the third port 343 may be connected to an inflow side of the third heat exchanger 300.

In this case, in the apparatus for controlling energy of a fuel cell vehicle in an exemplary embodiment, as the second coolant W2 may receive heat of the first coolant W1 by the third heat exchanger 300 at the initial stage of heating, the second coolant may be preheated in the third heat exchanger 300, may pass through the second connection line 320 and the first three-way valve 330, and may be supplied to the heater 410 of the heating line 400, thereby efficiently heating the interior.

As described above, in the apparatus for controlling energy of a fuel cell vehicle in an exemplary embodiment, by controlling the flow rate of the second coolant W2 flowing to the resistor cooling line 200, the second connection line 320, and the heating line 400 by the first and second three-way valves 330 and 340, the heat received from the stack cooling line 100 by the third heat exchanger 300 or the heat transferred to the stack cooling line 100 may be efficiently used.

Accordingly, in the apparatus for controlling energy of a fuel cell vehicle in an exemplary embodiment, the control of thermal energy may be optimized and the efficiency of heating and cooling may improve.

Alternatively, a surge tank 430 may be connected to the second connection line 320. The surge tank may be configured to remove air contained in the second coolant W2 of the resistor cooling line 200 or the heating line 400. The surge tank may be connected to a coolant supply source 440 for supplementing a shortage of coolant to the resistor cooling line or the heating line.

A distribution manifold 450 may be disposed in the connection point on the other side of the heating line 400. The distribution manifold may have at least three or more connection ports.

Specifically, the distribution manifold 450 may include a first connection port 451 for receiving the heated second coolant W2 from the heater 410, a second connection port 452 for providing the heated second coolant to the heating circuit system 420 in the interior of the vehicle, and a third connection port 453 for providing the heated second coolant to the braking resistor 210 of the resistor cooling line 200.

For example, as illustrated in FIG. 1, when the interior of the fuel cell vehicle is divided into a plurality of heating zones and a separate heating circuit system 420 is provided for each heating zone, a plurality of the first and second connection ports 451 and 452 may be provided according to the numbers of the heating circuit system 420 and the heater 410, other than the third connection port 453 through which the second coolant W2 flows to the resistor cooling line 200.

Figure 2:
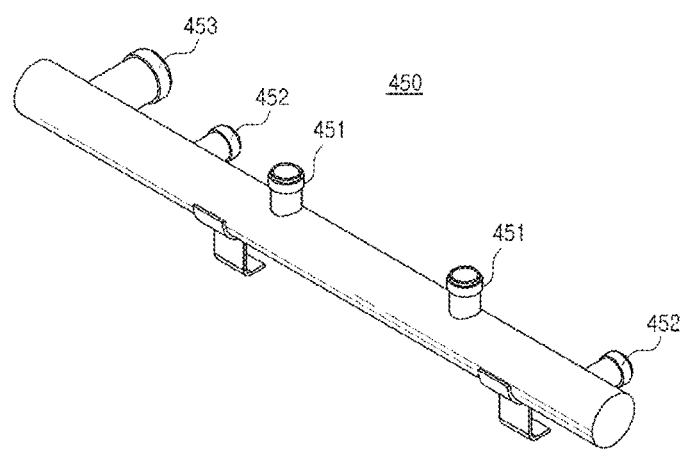
FIG. 2 is a perspective diagram illustrating a distribution manifold illustrated in FIG. 1.

FIG. 2 is a perspective diagram illustrating a distribution manifold illustrated in FIG. 1, illustrating a distribution manifold having five connection ports. Two first connection ports 451 and two second connection ports 452 may be provided, and one third connection port 453 may be provided.

The heating circuit system 420 and the heater 410 may be connected to the distribution manifold 450 in parallel. Also, the plurality of first and second connection ports 451 and 452 may have different diameters depending on the required flow rate.

Accordingly, the heating line 400 in which the second coolant W2 circulates along the first three-way valve 330—the heater 410—the distribution manifold 450—the heating circuit system 420—the first three way valve 330 may be provided.

The distribution manifold 450 may connect the heating line 400 to the resistor cooling line 200. Accordingly, in the apparatus for controlling energy of a fuel cell vehicle in an exemplary embodiment, when the second coolant W2 flowing out of the heater 410 and heated is discharged from the distribution manifold 450 to the heating circuit system 420 and the braking resistor 210, the second coolant may be supplied at the same temperature at the stable flow rate.

Also, by employing the distribution manifold 450, the number of components and the space required for the apparatus for controlling energy of a fuel cell vehicle in an exemplary embodiment may be reduced, thereby reducing costs and increasing usable space in the vehicle.

Accordingly, the apparatus for controlling energy of a fuel cell vehicle in an exemplary embodiment may obtain the effect of simplifying the layout of the device, and also improving efficiency in management and control performance.

FIG. 3 is a diagram illustrating a flow of electricity along with a flow of coolant in an apparatus for controlling energy of a fuel cell vehicle according to an exemplary embodiment.

A power system of a fuel cell vehicle to which the apparatus for controlling energy of the exemplary embodiment is applicable may include a fuel cell stack 110 used as a main power source; a battery 510 used as an auxiliary power source; a DC/DC converter 610 connected between the fuel cell stack and the battery; an inverter 620 connected to the battery and the DC/DC converter; and a driving motor 630 connected to the inverter and providing driving force to the vehicle.

The fuel cell stack 110 may convert chemical energy into electrical energy using hydrogen and oxygen and may generate electricity. The fuel cell stack may adjust the output by controlling the amounts of provided hydrogen and oxygen, and the control may be performed by a vehicle control unit (VCU) 600.

Electricity output by the fuel cell stack 110 may be used to charge the battery 510 and also to drive the driving motor 630.

The battery 510 may be configured to store electrical energy to drive the driving motor 630 generating the driving force of the vehicle, and may be charged by receiving electrical energy generated when the fuel cell stack 110 operates, or may be charged by recovering electrical energy regenerated from the driving motor during braking.

In the battery 510, the battery cooling line 500 for cooling the battery may be provided independently from the aforementioned cooling line and the connection line.

The battery cooling line 500 may include a battery heat exchanger 520 integrated with the second heat exchanger 220 and modularized. The battery heat exchanger may be configured to cool the third coolant W3 flowing along the battery cooling line, and may be configured as a radiator. The third coolant may be water or an incompressible fluid.

The battery heat exchanger 520 may be cooled by receiving a constant airflow from the fan 221 of the second heat exchanger 220.

The battery cooling line 500 may include a third pump 530 for pumping the third coolant W3. The third pump may be configured as an electric water pump driven by a motor receiving power from the battery 510 and circulating the third coolant.

Accordingly, the battery 510 may be cooled by the third coolant W3 circulating between the battery 510 and the battery heat exchanger 520 by the third pump 530. The third coolant heated while cooling the battery may be cooled by the battery heat exchanger, may flow back into the battery and may cool the battery.

The DC/DC converter 610 may be configured as a unidirectional DC/DC converter connected to an output terminal of the fuel cell stack 110 and adjusting electrical energy supplied to the load to be boosted as a constant voltage or to be stably output.

The inverter 620 may convert direct-current electrical energy supplied from the fuel cell stack 110 through the DC/DC converter 610 or direct-current electrical energy stored in the battery 510 into an alternating current electrical energy having a plurality of phases and may provide the electrical energy to the driving motor 630, or may convert alternating-current electrical energy regenerated by the driving motor during braking into direct-current electrical energy, may supply the electrical energy to the battery through the DC/DC converter and may charge the battery.

The driving motor 630 may convert the supplied electrical energy into rotational kinetic energy for driving the vehicle. The driving motor may be connected to the fuel cell stack 110 or the battery 510 via the inverter 620 and may provide driving force to the vehicle, and may provide electrical energy regenerated during braking to the battery 510.

During braking, the driving motor 630 may work as a generator rotating by driving inertia of the vehicle and generating electricity, and the generated electricity may be consumed to charge the battery 510, such that kinetic energy of the vehicle may be converted into electrical energy to correspond to the amount of consumption, and deceleration may occur.

In the power system configured as above, the driving motor 630, a load, may be driven by being supplied with the power of the fuel cell stack 110, which is supplied with an adjusted voltage by the DC/DC converter 610, as a main power source. The power of the battery 510 may perform a function of assisting the fuel cell stack which may be the main power source, and electrical energy regenerated from the driving motor during braking may be charged in the battery.

Also, the battery 510 may be electrically connected to the drive motor 630, and may also be electrically connected to a fan 121 of the first heat exchanger 120, the first pump 130, the fan 221 of the second heat exchanger 220, the second pump 230, the heater 410, the braking resistor 210, and the third pump 530 constituting an apparatus for controlling energy of a fuel cell vehicle and may provide power.

The control unit 600 may be electrically connected to the battery 510 and may share information on the charging/discharging state with the driving motor 630. Also, the control unit may be electrically connected to the drive motor and may operate the drive motor, and may generate a reverse torque for auxiliary braking.

Further, the control unit 600 may be electrically connected to the fan 121 of the first heat exchanger 120, the first pump 130, the fan 221 of the second heat exchanger 220, the second pump 230, the first three-way valve 330, the second three-way valve 340, the heater 410, and the third pump 530 and may control the operations of the respective components according to a driver's request or a determined command.

The heater 410 may operate according to the operation of the heater switch by a driver or a command of the control unit 600. The braking resistor 210 may operate according to the manipulation of the lever L by a driver for auxiliary braking and a command from the control unit.

The fan 121 of the first heat exchanger 120, the first pump 130, the fan 221 of the second heat exchanger 220, the second pump 230, the heater 410, the braking resistor 210, and the third pump 530 may be controlled to work as an energy consuming device for regenerative braking.

A control sequence of energy consumption may be determined according to an importance required for safety or a frequency of use. For example, the control may be performed with the braking resistor 210 as a priority, and when target performance of energy consumption is insufficient, the first to third pumps 130, 230, and 530, the fan 121 of the first heat exchanger 120 or the fan 221 of the second heat exchanger 220, and the heater 410 may be controlled to operate in sequence.

Through the configuration described above, the apparatus for controlling energy of a fuel cell vehicle in an exemplary embodiment may enable electrical energy to be consumed through a variety of means, such that the braking force required for auxiliary braking may be continuously generated and maintained.

Accordingly, the apparatus for controlling energy of a fuel cell vehicle in an exemplary embodiment may expand the usable range of the energy consuming device and may sufficiently satisfy laws pertaining to auxiliary braking.

Hereinafter, an operation mode of the apparatus for controlling energy of a fuel cell vehicle in an exemplary embodiment will be described in greater detail.

FIGS. 4 to 10 are diagrams illustrating an operating state in each mode in an apparatus for controlling energy of a fuel cell vehicle according to an exemplary embodiment.

Figure 4:
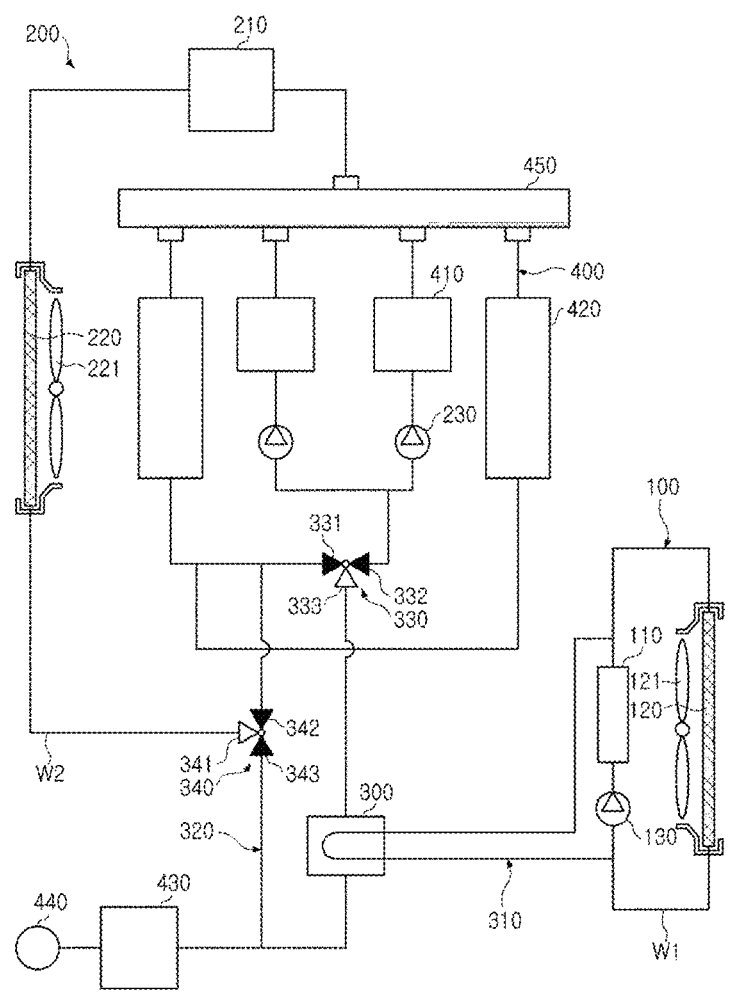
FIGS. 4 to 10 are diagrams illustrating an operating state in each mode in an apparatus for controlling energy of a fuel cell vehicle according to an exemplary embodiment of the present disclosure.

FIG. 4 illustrates a normal mode. The normal mode may be an initialization state in which abnormal operation such as disconnection of each component included in the apparatus for controlling energy may be identified, and the vehicle may be started and stopped in this mode. In this case, all components including the braking resistor 210 and the heater 410 may not operate.

A valve body of the first three-way valve 330 may be disposed in, for example, the zero position, the third port 333 of the first three-way valve may be closed, and the first port 331 may be connected to the second port 332.

A valve body of the second three-way valve 340 may be disposed in, for example, the zero position, the first port 341 of the second three-way valve may be closed, and the second port 342 may be connected to the third port 343.

Accordingly, the second coolant W2 may be stagnant in the resistor cooling line 200, the second connection line 320 and the heating line 400.

Figure 5:
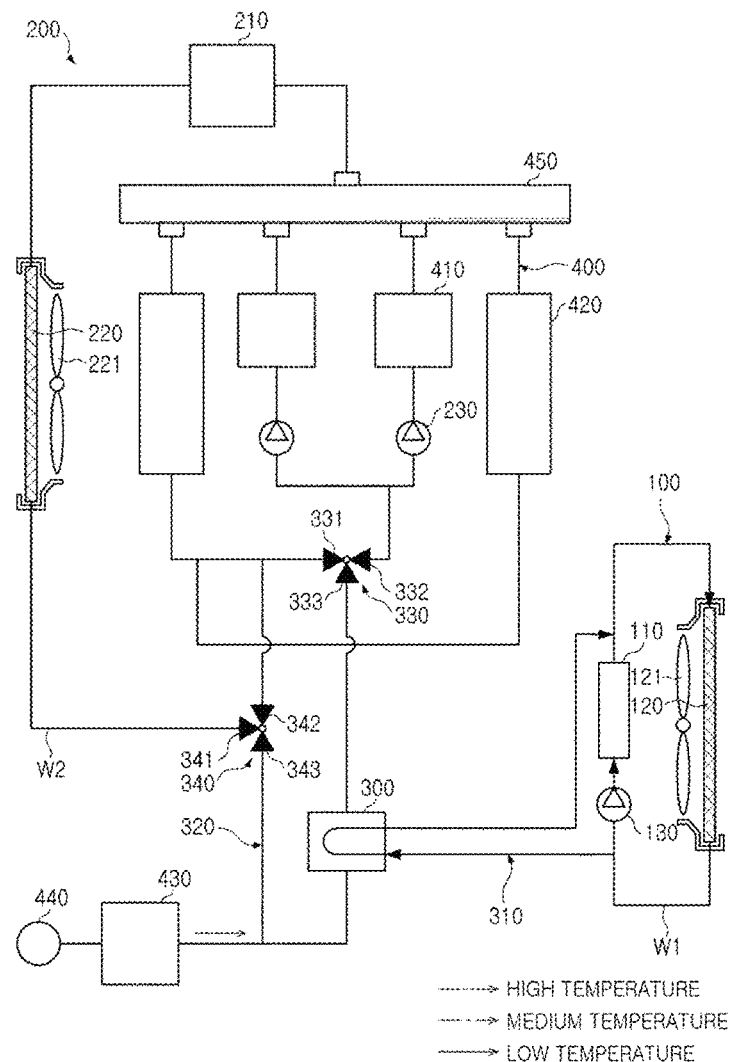

FIG. 5 illustrates a maintenance mode. In the maintenance mode, an initial injection of coolant and an initial opening state of the three-way valves 330 and 340 may be identified. In this case, most of the components including the braking resistor 210 and the heater 410 may not operate.

The first three-way valve 330 may be controlled to rotate the valve body thereof at an angle of, for example, 45°, such that the first port 331, the second port 332 and the third port 333 of the first three-way valve may be connected to each other.

The second three-way valve 340 may be controlled to rotate the valve body thereof at an angle of, for example, 45°, such that the first port 341, the second port 342 and the third port 343 of the second three-way valve may be connected to each other.

As described above, each valve body of the first and second three-way valves 330 and 340 may be disposed in a neutral position, such that the coolant may be smoothly injected from the surge tank 430 to the heating line 400 and the resistor cooling line 200 through the second connection line 320, and also, the initial angle state of the valve body, the initial opening state of the three-way valve may be identified.

Also, if desired, the fuel cell stack 110 may operate.

Figure 6:
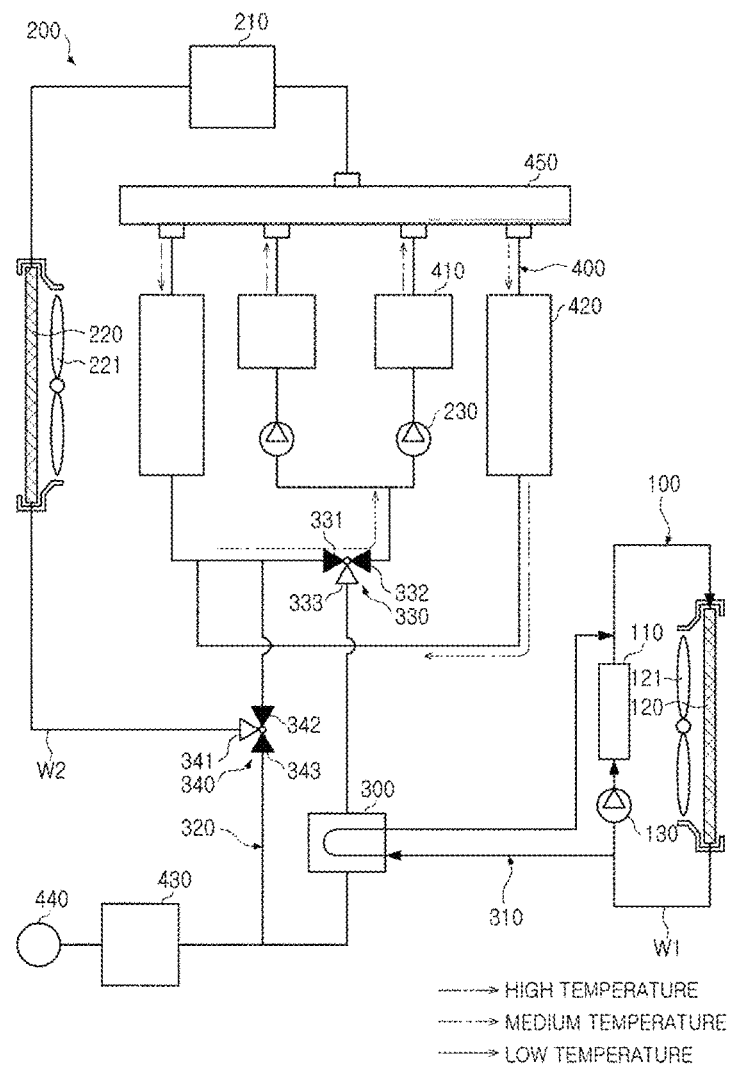

FIG. 6 illustrates a first heating mode. The first heating mode may be for heating the interior of the vehicle, and in this mode, the driver may operate the heater 410 and the blower of the heating circuit system 420 by manipulating a heater switch.

The first three-way valve 330 may be controlled to rotate the valve body thereof at an angle of, for example, 5°, such that the third port 333 of the first three-way valve may be closed, and the first port 331 may be connected to the second port 332.

The second three-way valve 340 may be controlled to rotate the valve body at an angle of, for example, 5°, such that the first port 341 of the second three-way valve may be closed, and the second port 342 may be connected to the third port 343.

Accordingly, the second coolant W2 of medium temperature heated by the heater 410 may transfer heat to the heating circuit system 420 in the interior of the vehicle, may flow to the second pump 230 and may circulate along the heating line 400. To satisfy the heating performance, a rotation speed (rpm) of the second pump, capacity of the heater, and specifications of the blower included in the heating circuit system of the interior may be determined according to the vehicle.

Figure 7:
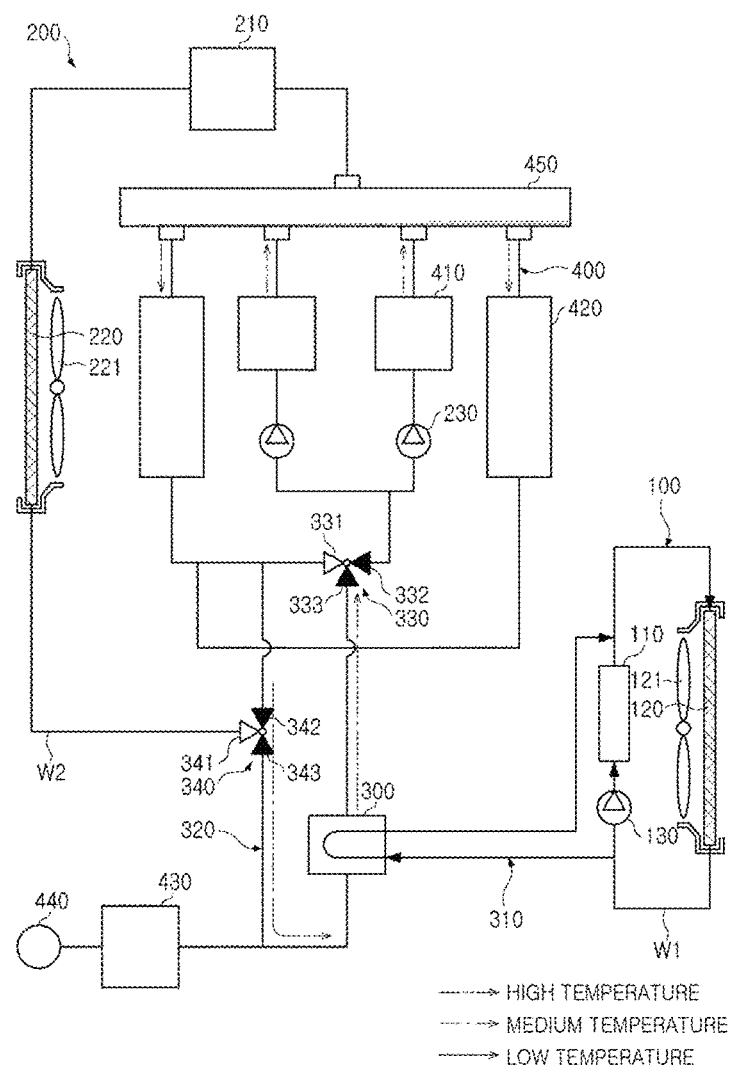

FIG. 7 illustrates a second heating mode. The second heating mode is for heating the interior of the vehicle, and in this mode, the driver may operate the heater 410 and the blower of the heating circuit system 420 by manipulating a heater switch, and further, thermal energy may be supplied to the heating line 400 through the third heat exchanger 300.

The first three-way valve 330 may be controlled to rotate the valve body thereof at an angle of, for example, 95°, such that the first port 331 of the first three-way valve may be closed, and the third port 333 may be connected to the second port 332.

The second three-way valve 340 may be controlled to rotate the valve body at an angle of, for example, 5°, such that the first port 341 of the second three-way valve may be closed, and the second port 342 may be connected to the third port 343.

Accordingly, the second coolant W2 of medium temperature heated by the heater 410 may transfer heat to the heating circuit system 420 in the interior of the vehicle, may pass through the second three-way valve 340 and may flow into the third heat exchanger 300. In the third heat exchanger, the second coolant may be preheated by heat exchange with the first coolant W1 of the stack cooling line 100, may pass through the first three-way valve 330 and the second pump 230, and may flow to the heater 410. In the second heating mode, the second coolant may circulate along the heating line 400 and the second connection line 320.

For example, when the state of charge (SOC) in the fuel cell vehicle is below an appropriate level or the maximum power is further required, the fuel cell stack 110 may operate to obtain power and an exothermic reaction may occur, and cooling may be required for the heat generated therefrom.

The first coolant W1 heated while cooling the fuel cell stack 110 may be cooled by the first heat exchanger 120, but may have a relatively higher temperature than that of the second coolant W2 in the initial heating or after rapidly radiating heat to the heating circuit system 420, and may have substantial thermal energy.

Accordingly, the apparatus for controlling energy of a fuel cell vehicle in an exemplary embodiment may supply the heat generated in the fuel cell stack 110 to the heater 410 and the heating circuit system 420 through the third heat exchanger 300 by the second heating mode. Thus, the apparatus for controlling energy of a fuel cell vehicle in an exemplary embodiment may reduce the operation of the heater 410 and may improve the energy efficiency (mileage per 1 kw of the electric vehicle) of the vehicle.

Figure 8:
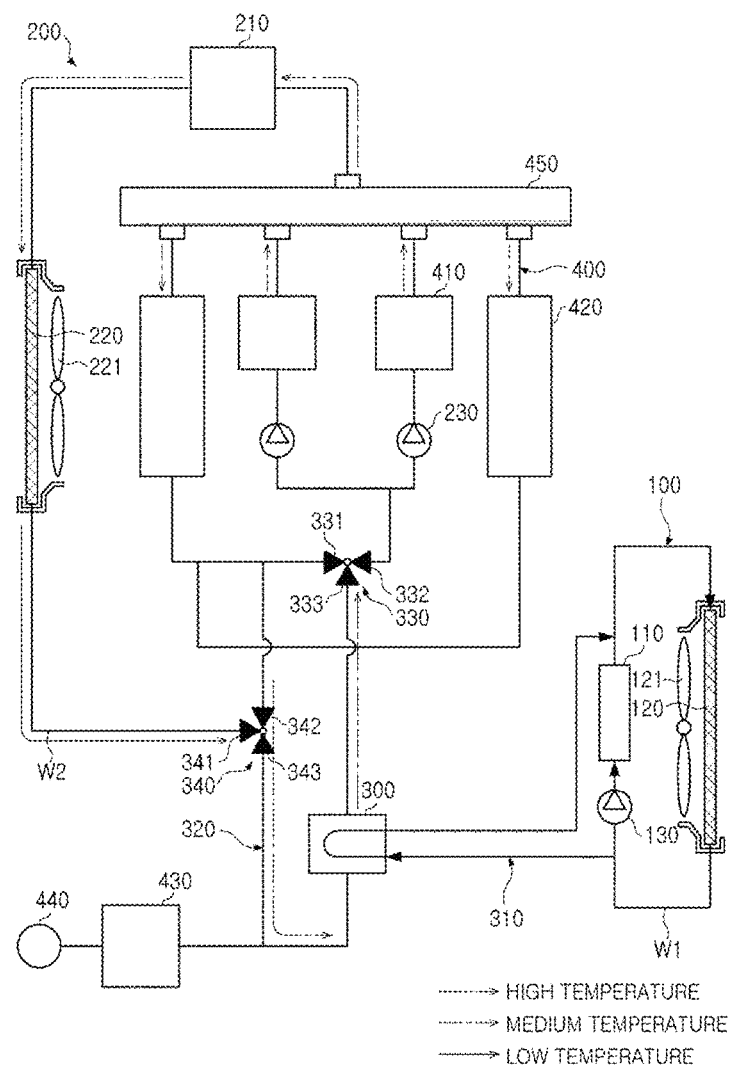

FIG. 8 illustrates a heating and braking mode. The heating and braking mode may be a state in which it may be necessary to operate the braking resistor 210 while the driver operates the heater 410 and the blower of the heating circuit system 420 by manipulating the heater switch, that is, a state in which heating of the interior of the vehicle and auxiliary braking may be necessary.

The first three-way valve 330 may be controlled to rotate the valve body thereof at an angle of, for example, 75°, such that the first port 331, the second port 332 and the third port 333 of the first three-way valve may be connected to each other.

The second three-way valve 340 may be controlled to rotate the valve body thereof at an angle of, for example, 75°, such that the first port 341, the second port 342 and the third port 343 of the second three-way valve may be connected to each other.

Accordingly, a portion of the second coolant W2 of medium temperature heated by the heater 410 may transfer heat to the heating circuit system 420 in the interior of the vehicle, may pass through the first three-way valve 340 and may flow to the heater 410, or may be branched, may pass through the second three-way valve 340, the third heat exchanger 300, the first three-way valve 330 and the second pump 230, and may flow to the heater 410.

Also, the other portion of the second coolant W2 of medium temperature heated by the heater 410 may pass through the distribution manifold 450 and may be supplied to the braking resistor 210, and the second coolant further heated in the braking resistor 210 may be cooled in the second heat exchanger 220, may pass through the second three-way valve 340, the third heat exchanger 300, the three-way valve 330 and the second pump 230 and may flow to the heater 410.

In the heating and braking mode, the second coolant W2 may circulate along the heating line 400, the resistor cooling line 200 and the second connection line 320.

As for the first and second three-way valves 330 and 340, the angles of the valve bodies thereof may be determined to be, for example, 75°, such that 25% of the total flow rate of the second coolant W2, for example, may flow along the heating line 400, 75% may flow along the resistor cooling line 200, and the remainder may flow along the second connection line 320.

The required flow rate may be varied depending on the performance of the vehicle, and accordingly, the determined angle of the valve body may be not necessarily limited to the above-described example and may be varied.

In the heating and braking mode, the braking resistor 210 may operate together with the heater 410 and may use the heated second coolant W2, which may contribute to the heating of the interior of the vehicle, and conversely, the heater 410 may operate together with the braking resistor 210, which may contribute to generating a braking force for auxiliary braking.

Figure 9:
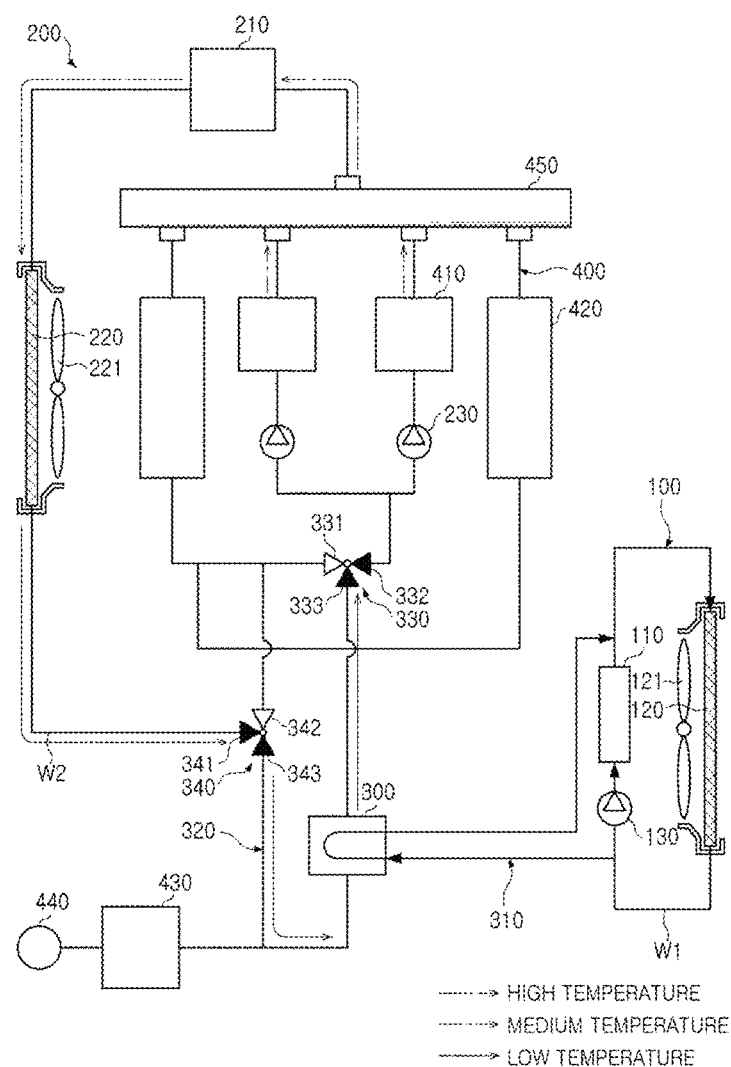

FIG. 9 illustrates a braking mode. The braking mode may be for maximum energy consumption, and in this mode, the braking resistor 210 and also the pump, the fan, and the heater 410 may operate. However, since the mode is not for heating, the blower included in the heating circuit system 420 may not operate.

The first three-way valve 330 may be controlled to rotate the valve body thereof at an angle of, for example, 95°, such that the first port 331 of the first three-way valve may be closed, and the third port 333 may be connected to the second port 332.

The second three-way valve 340 may be controlled to rotate the valve body thereof at an angle of, for example, 95°, such that the second port 342 of the second three-way valve may be closed, and the first port 341 may be connected to the third port 343.

Accordingly, the second coolant W2 of the medium temperature heated by the heater 410 may pass through the distribution manifold 450 and may be supplied to the braking resistor 210, and the second coolant of high temperature further heated in the braking resistor 210 may be cooled in the second heat exchanger 220, may pass through the second three-way valve 340, and may flow into the third heat exchanger 300. In the third heat exchanger, the second coolant may exchange heat with the first coolant W1 of low temperature, which have passed through the first heat exchanger 120, and may radiate the heat, may pass through the first three-way valve 330 and the second pump 230 and may flow to the heater 410.

In the braking mode, the second coolant W2 may circulate along the resistor cooling line 200 and the second connection line 320.

The apparatus for controlling energy of a fuel cell vehicle in an exemplary embodiment may secure regenerative braking by operating the braking resistor 210 and also the pump, the fan, and the heater 410 in the braking mode, and also, the cooling overload caused by the operation above may be addressed by further reducing the temperature of the second coolant W2 by 10° C. or more through the third heat exchanger 300.

Figure 10:
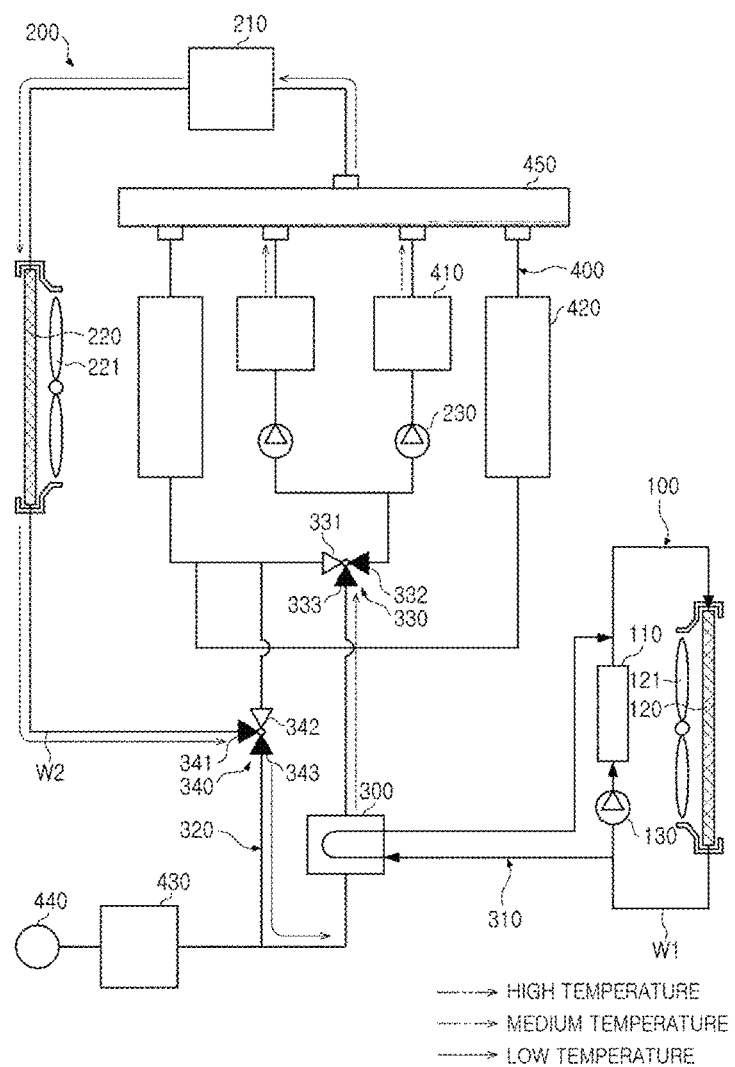

FIG. 10 illustrates a cooling mode. In the cooling mode, the braking resistor 210 and the heater 410 may not operate, and the cooling load of the stack cooling line 100 may increase due to the continuous operation of the fuel cell stack 110 in summer, for example.

The first three-way valve 330 may be controlled to rotate the valve body thereof at an angle of, for example, 95°, such that the first port 331 of the first three-way valve may be closed, and the third port 333 may be connected to the second port 332.

The second three-way valve 340 may be controlled to rotate the valve body thereof at an angle of, for example, 95°, such that the second port 342 of the second three-way valve may be closed, and the first port 341 may be connected to the third port 343.

Accordingly, the second coolant W2 may pass through the heater 410, the distribution manifold 450 and the braking resistor 210 in order, may be cooled to a low temperature in the second heat exchanger 220, may pass through the second three-way valve 340 and may flow into the third heat exchanger 300. In the third heat exchanger, the second coolant may absorb heat by exchange heat with the first coolant W1 of the stack cooling line 100, may pass through the first three-way valve 330 and the second pump 230 and may flow to the heater 410.

In the cooling mode, the second coolant W2 may circulate along the resistor cooling line 200 and the second connection line 320.

The apparatus for controlling energy of a fuel cell vehicle in an exemplary embodiment may increase the cooling performance of the stack cooling line 100 by the cooling mode.

According to the aforementioned exemplary embodiments, the laws pertaining to auxiliary braking may be satisfied, and the usable range of the energy consuming device in a fuel cell vehicle may expand.

Also, as the stack cooling line, the resistor cooling line, and the heating line are configured to operate complementary to each other through the third heat exchanger, the control of thermal energy may be optimized and the efficiency of heating and cooling may improve.

Further, by using the distribution manifold, the layout of the device may be simplified, and also the second coolant may be stably supplied to the resistor cooling line and the heating line, such that the efficiency of management and control performance may improve.

While the exemplary embodiments have been illustrated and described above, it will be apparent to those skilled in the art that modifications and variations could be made without departing from the scope of the present invention as defined by the appended claims.

What is claimed is:

1. An apparatus for controlling energy of a fuel cell vehicle, the apparatus comprising:
a stack cooling line having a first coolant heated by a fuel cell stack and cooled by a first heat exchanger;
a resistor cooling line having a second coolant heated by a braking resistor and cooled by a second heat exchanger;
a third heat exchanger configured to exchange heat between the first coolant of the stack cooling line and the second coolant of the resistor cooling line;
a first connection line connecting the third heat exchanger to the stack cooling line; and
a second connection line connecting the third heat exchanger to the resistor cooling line,
wherein, among connection points between the resistor cooling line and the second connection line, a first three-way valve is installed in a connection point where the second coolant flows into the braking resistor, and a second three-way valve is installed in a connection point adjacent to the second heat exchanger, of which the second coolant flows out.

2. The apparatus of claim 1, wherein the third heat exchanger is configured to exchange heat between the first coolant flowing out of the first heat exchanger before flowing into the fuel cell stack and the second coolant flowing out of the second heat exchanger before flowing into the braking resistor.

3. The apparatus of claim 2, further comprising:
a heating line connected to the resistor cooling line,
wherein the heating line includes at least one heater for heating the second coolant to increase a temperature of the second coolant, and
wherein the heating line is connected to a heating circuit system for heating an interior of the vehicle.

4. The apparatus of claim 3,
wherein the first three-way valve is disposed in a connection point on a first side of the heating line, and
wherein the heating line is connected to the second connection line.

5. The apparatus of claim 4,
wherein a first port of the first three-way valve is connected to a heating circuit system side of the heating line, a second port is connected to a heater side of the heating line, and a third port is connected to an outlet side of the third heat exchanger, and
wherein a first port of the second three-way valve is connected to a second heat exchanger side of the resistor cooling line, a second port is connected to the heating circuit system side of the heating line, and the third port is connected to an inflow side of the third heat exchanger.

6. The apparatus of claim 5,
wherein a distribution manifold is disposed in a connection point on a second side of the heating line opposing the first side, and
wherein the distribution manifold has at least three connection ports.

7. The apparatus of claim 6, wherein the distribution manifold includes:
a first connection port for receiving the second coolant from the at least one heater,
a second connection port for providing the second coolant to the heating circuit system, and a third connection port for providing the second coolant to the braking resistor of the resistor cooling line.

8. The apparatus of claim 7, wherein the heating circuit system and the at least one heater are connected to the distribution manifold in parallel.

9. The apparatus of claim 6,
wherein, when operating in a first heating mode, the at least one heater operates, and
wherein the second coolant heated by the at least one heater transfers heat to the heating circuit system and circulates along the heating line.

10. The apparatus of claim 9,
wherein, in the first heating mode, the third port of the first three-way valve is closed, and the first port is connected to the second port, and
wherein, in the first heating mode, the first port of the second three-way valve is closed, and the second port is connected to the third port.

11. The apparatus of claim 6,
wherein, when operating in a second heating mode, the at least one heater operates,
wherein the second coolant heated by the at least one heater transfers heat to the heating circuit system and flows into the second connection line, and
wherein the second coolant in the third heat exchanger is preheated by exchanging heat with the first coolant, and circulates to be supplied to the at least one heater.

12. The apparatus of claim 11,
wherein, in the second heating mode, the first port of the first three-way valve is closed, and the third port is connected to the second port, and
wherein, in the second heating mode, the first port of the second three-way valve is closed, and the second port is connected to the third port.

13. The apparatus of claim 6,
wherein, when operating in a heating and braking mode, the at least one heater and the braking resistor operate,
wherein a portion of the second coolant heated by the at least one heater transfers heat to the heating circuit system and flows into the second connection line or circulates along the heating line,
wherein another portion of the second coolant heated by the at least one heater passes through the distribution manifold, is supplied to the braking resistor, is further heated in the braking resistor, flows along the resistor cooling line, and flows into the second connection line, and
wherein the second coolant passing through the third heat exchanger circulates to be supplied to the at least one heater.

14. The apparatus of claim 13,
wherein, in the heating and braking mode, the first port, the second port, and the third port of the first three-way valve are connected to each other, and
wherein, in the heating and braking mode, the first port, the second port, and the third port of the second three-way valve are connected to each other.

15. The apparatus of claim 6,
wherein, when operating in a braking mode, at least the braking resistor among the heater and the braking resistor operates,
wherein the second coolant passing through the at least one heater passes through the distribution manifold, is supplied to the braking resistor, is heated in the braking resistor, flows along the resistor cooling line, and flows into the second connection line,
wherein the second coolant in the third heat exchanger exchanges heat with the first coolant passing through the first heat exchanger, radiates heat, and circulates to be supplied to the at least one heater,
wherein the first port of the first three-way valve is closed, and the second port is connected to the third port, and
wherein the second port of the second three-way valve is closed, and the first port is connected to the third port.

16. The apparatus of claim 6,
wherein, when operating in a cooling mode, the at least one heater and the braking resistor do not operate,
wherein the second coolant passes through the at least one heater, the distribution manifold, and the braking resistor, flows along the resistor cooling line, and flows into the second connection line,
wherein the second coolant in the third heat exchanger exchanges heat with the first coolant of the stack cooling line, absorbs heat, and circulates to be supplied to the at least one heater,
wherein the first port of the first three-way valve is closed, and the second port is connected to the third port, and
wherein the second port of the second three-way valve is closed, and the first port is connected to the third port.

17. The apparatus of claim 3,
wherein the braking resistor is electrically connected to a driving motor working as a generator during braking,
wherein, when braking, electrical energy regenerated by the driving motor is charged in the battery, and
wherein, when braking, at least one of a fan of the first heat exchanger, a first pump of the stack cooling line, a fan of the second heat exchanger, a second pump of the resistor cooling line, the at least one heater, the braking resistor, and a third pump of the battery cooling line for cooling the battery is controlled to work as an energy consuming device for regenerative braking.

* * * * *